(12) United States Patent
Muto

(10) Patent No.: US 6,898,446 B2
(45) Date of Patent: May 24, 2005

(54) PORTABLE TELEPHONE WITH A BATTERY ALARM FUNCTION INDICATING LOWEST LEVEL FOR COMMUNICATION

(75) Inventor: Takashi Muto, Tokyo (JP)

(73) Assignee: NEC Corporation (JP)

( * ) Notice: Subject to any disclaimer, the term of this patent is extended or adjusted under 35 U.S.C. 154(b) by 652 days.

(21) Appl. No.: 09/808,856

(22) Filed: Mar. 15, 2001

(65) Prior Publication Data

US 2001/0023198 A1 Sep. 20, 2001

(30) Foreign Application Priority Data

Mar. 17, 2000 (JP) ........................................ 2000-075294

(51) Int. Cl.$^7$ ................................................ H04B 1/00
(52) U.S. Cl. .................... 455/574; 455/343.5; 340/7.37
(58) Field of Search ................................. 455/573, 574, 455/343.5, 343.6, 421, 566; 340/7.37

(56) References Cited

U.S. PATENT DOCUMENTS

| 5,304,986 | A | | 4/1994 | Motegi |
| 5,870,685 | A | * | 2/1999 | Flynn ........................... 455/573 |
| RE36,712 | E | * | 5/2000 | Sato et al. .................... 455/574 |
| 6,141,570 | A | * | 10/2000 | O'Neill et al. ................ 455/574 |
| 6,427,072 | B1 | * | 7/2002 | Reichelt .................... 455/404.1 |
| 6,501,968 | B1 | * | 12/2002 | Ichimura ...................... 455/574 |

FOREIGN PATENT DOCUMENTS

| EP | 1 096 264 | 5/2001 |
| GB | 2278922 | 12/1994 |
| GB | 2326545 | 12/1998 |
| JP | 4-265866 | 9/1992 |
| JP | 7-131402 | 5/1995 |
| JP | 11-174093 | 7/1999 |
| JP | 11-205422 | 7/1999 |
| JP | 11-341120 | 12/1999 |
| JP | 2000-59473 | 2/2000 |

OTHER PUBLICATIONS

European Examination report dated Jul. 17, 2003.
Japanese Office Action issued Sep. 2, 2003 (w/ English translation of relevant portion).

* cited by examiner

Primary Examiner—Nick Corsaro
(74) Attorney, Agent, or Firm—Dickstein, Shapiro, Morin & Oshinsky, LLP.

(57) ABSTRACT

A portable telephone apparatus including a battery alarm function wherein consumption of a battery apparatus through use of an additional function other than a talking function can be prevented to assure a lowest operation voltage for the talking function. The portable telephone apparatus includes a rechargeable battery, and a battery supervision section. The battery supervision section includes a voltage detection section for supervising and detecting a voltage of the battery controlled by a control section, and an alarming section for issuing a lowest operation voltage level alarm under the control of the control section when the detected voltage drops to a lowest operation voltage level that a talking function of the portable telephone apparatus can operate. The alarming section issues a supervision voltage level alarm when the detected voltage of the battery drops to a supervision voltage level different from the lowest operation voltage level.

1 Claim, 3 Drawing Sheets

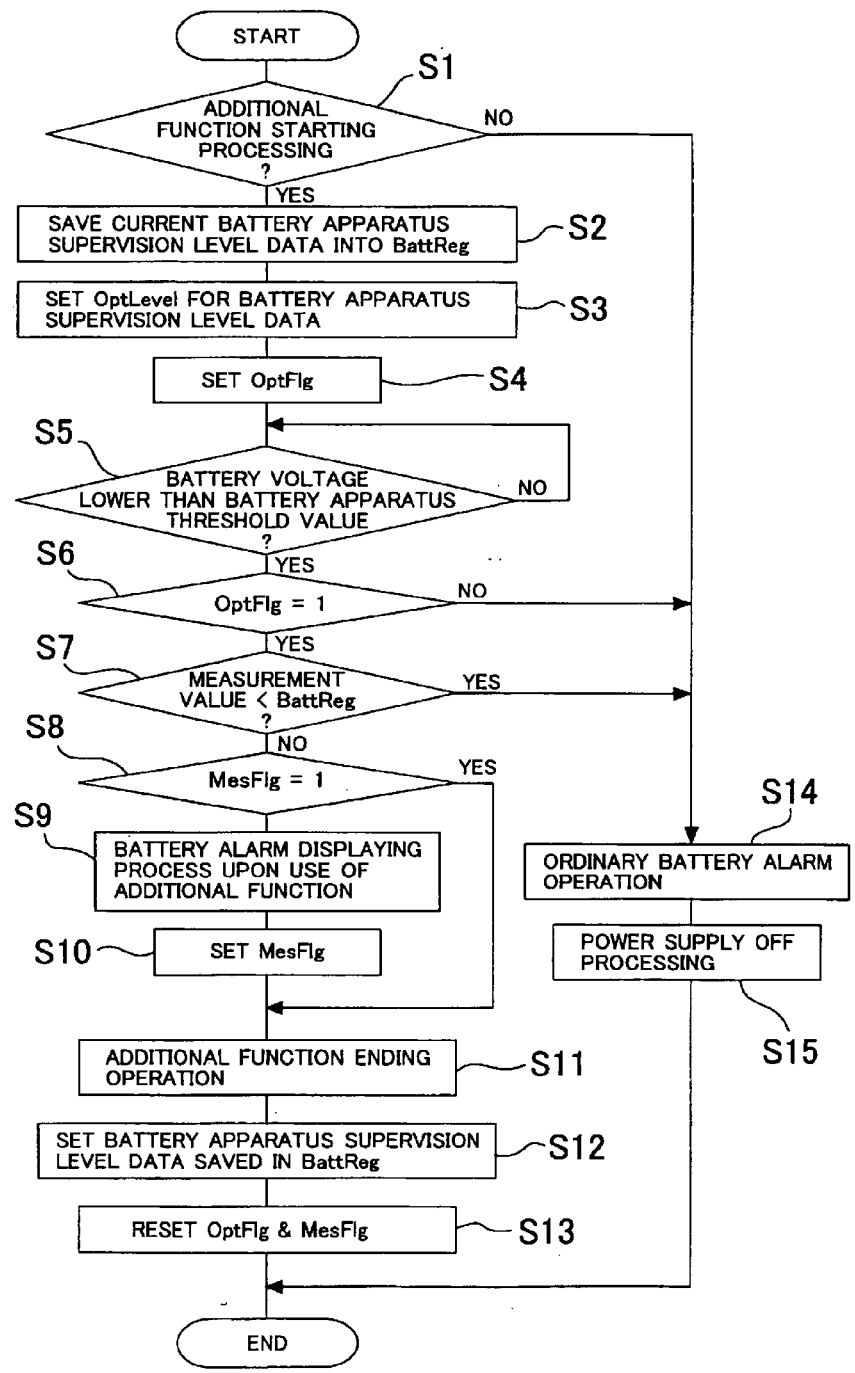

PORTABLE TELEPHONE WITH A BATTERY ALARM FUNCTION INDICATING LOWEST LEVEL FOR COMMUNICATION

BACKGROUND OF THE INVENTION

1. Field of the Invention

The present invention relates to a portable telephone apparatus provided with a battery alarm function of detecting the voltage level of a battery apparatus and issuing a predetermined battery alarm when a voltage remaining amount drops.

2. Description of the Related Art

A portable telephone apparatus such as a portable cellular phone or a PHS (Personal Handyphone System) terminal uses a battery apparatus provided in an apparatus body as a driving power supply.

Generally, a battery apparatus of a portable telephone apparatus of the type mentioned can be charged to a fixed voltage by means of a charger or the like, and every time the voltage of the battery apparatus drops through use of the telephone apparatus, the battery apparatus is charged to allow the telephone apparatus to be used repetitively.

Usually, a detection element for detecting the voltage level of a battery apparatus is provided in a body or some other element of a telephone apparatus, and if the voltage drops to a predetermined level through use of the telephone apparatus, then a predetermined battery alarm is issued.

Consequently, the user can perform a charging operation before the voltage of the battery apparatus drops fully to zero and therefore can use the portable telephone apparatus continually without any trouble.

A portable telephone apparatus provided with detection and alarm means for a battery apparatus of the type mentioned is disclosed, for example, in Japanese Patent Laid-Open No. 265866/1992 entitled "Battery Voltage Drop Alarming Method".

In recent years, increase of functions and applications of a portable telephone apparatus has been and is proceeding quickly. Particularly recently, a portable telephone apparatus is provided with, in addition to a talking function with an external apparatus which is an original function of a telephone set (and a displaying function, a voice function, and a setting inputting function necessary for the talking function), various additional functions which have not been provided for conventional portable telephone apparatus such as, for example, a transmission/reception function of an electronic mail, a connection function to the Internet, a game function and a music playback function.

Such increase of functions of a portable telephone apparatus and diversification of additional functions involved therein tend to increase, and it is estimated that further various additional functions are provided in future.

Such various additional functions as mentioned above sometimes require high driving power when compared with the talking function which is an original function of a portable telephone set, and frequent use of such additional functions drops the voltage of the battery apparatus suddenly.

In such a case, in a conventional portable telephone apparatus, an alarm is issued from a battery voltage detection section at a point of time when the voltage of the battery apparatus drops to the lowest voltage level with which the talking function is possible.

Accordingly, if use of an additional function is stopped immediately at a point of time when an alarm is issued and then the battery apparatus is charged, then it is possible to assure the lowest operation voltage with which the talking function operates before the battery apparatus is charged up.

Actually, however, it is sometimes difficult to immediately stop use of an additional function after issuance of a battery alarm.

Further, even if an alarm is issued, the user sometimes discriminates that the battery voltage is still sufficient and therefore continues the use of an additional function.

Therefore, particularly a recent portable telephone apparatus which incorporates various additional functions of high performances has a problem in that, before the user becomes aware, the battery voltage drops until use of the original talking function (origination/termination functions) of a telephone set is disabled before the battery apparatus is charged.

Japanese Patent Laid-Open No. 265866/1992 mentioned above discloses a method of setting an estimation time until the voltage of a battery apparatus drops to the lowest operation voltage level and issuing an alarm.

According to the method, however, a dropping timing to the lowest operation voltage for the original talking function of a telephone set is estimated similarly to the conventional alarm function. Thus, the method cannot be applied well to a portable telephone apparatus of the multi-function type which involves two or more voltages of different lowest operation levels for the talking function and additional functions and with which supervision of a high operation voltage necessary for the additional functions is required.

SUMMARY OF THE INVENTION

It is an object of the present invention to provide a portable telephone apparatus with a battery alarm function wherein consumption of a battery apparatus through use of an additional function other than a talking function can be prevented with certainty to assure a lowest operation voltage for the talking function and multiple functions are available.

It is another object of the present invention to provide a portable telephone apparatus with a battery alarm function which is suitable particularly for a digital portable telephone apparatus provided with various additional functions such as a connection function to the Internet, a game function and a music data playback function.

In order to attain the objects described above, according to the present invention, a portable telephone apparatus with a battery alarm function includes supervision means which can set an arbitrary voltage different from a lowest operation voltage necessary for operation of a talking function as a supervision voltage level.

In particular, there is provided a portable telephone apparatus with a battery alarm function, comprising a rechargeable battery apparatus, and battery supervision means for supervising and detecting a voltage of the battery apparatus and issuing a lowest operation voltage level alarm when the detected voltage drops to a lowest operation voltage level with which a talking function of the portable telephone apparatus can operate but issuing a supervision voltage level alarm when the voltage of the battery apparatus detected by the battery supervision means drops to a predetermined supervision voltage level different from the lowest operation voltage level.

In the portable telephone apparatus with a battery alarm function, since the battery supervision means thereof sets a voltage different from the lowest operation voltage necessary for operation of an original talking function of a telephone set as a supervision voltage level, that the voltage of a battery apparatus has dropped through use of an additional function other than the talking function can be detected definitely and with certainty and can be conveyed to the user.

Consequently, the user can definitely recognize a drop of the battery voltage and consumption of the battery apparatus through use of an additional function and can perform charging of the battery apparatus precisely before the lowest operation voltage necessary for operation of the original talking function of a telephone set is reached. Therefore, the portable telephone apparatus with a battery alarm function can be formed so as to cope with various multiple functions in recent years while assuring the lowest operation voltage necessary for operation of the original talking function of a telephone set thereby to assure the talking function.

The portable telephone apparatus with a battery alarm function is particularly suitable as a digital portable telephone apparatus provided with various additional functions such as a connection function to the Internet, a game function and a playback function of music data.

The portable telephone apparatus with a battery alarm function may be constructed such that the battery supervision means can set the supervision voltage level to an arbitrary value.

With the portable telephone apparatus with a battery alarm function, the supervision voltage level for the lowest operation level for an additional function can be set arbitrarily, and an alarm can be issued with an optimum supervision voltage level corresponding to a necessary operation voltage which is different among different additional functions.

Consequently, with the portable telephone apparatus with a battery alarm function, the lowest operation level necessary for the talking function can be assured while driving an additional function making the most of the voltage of the battery apparatus.

Preferably, the battery supervision means can set a plurality of values as the supervision voltage level.

With the portable telephone apparatus with a battery alarm function, it is possible to set a plurality of supervision voltage levels for each additional function or to set supervision voltage levels different from each other for two or more additional functions.

Consequently, it is possible to issue alarms at different stages in response to a drop level of the battery voltage or to issue an alarm for each of two or more additional functions whose operation voltages are different from each other in this manner. Consequently, information such as at what level the voltage of the battery apparatus is or which additional function is disabled and which additional function is enabled can be conveyed to the user with certainty.

Consequently, the user can use the telephone apparatus of the multi-function type free from care without being concerned about inadvertent consumption of the battery apparatus.

In this instance, preferably the battery supervision means issues the supervision voltage level alarm in a manner different for each of the plurality of values of the supervision voltage level.

With the portable telephone apparatus with a battery alarm function, it is possible to issue an alarm at different stages in response to a dropping level of the voltage or issue an alarm for each of two or more additional functions for which different lowest operation voltages are required.

Consequently, information of at what level the voltage of the battery apparatus is, which additional function cannot be used and which additional function can be used and so forth can be conveyed with certainty to the user.

Consequently, the user can use the multi-function telephone apparatus free from care without being concerned about inadvertent consumption of the battery apparatus.

Preferably, the supervision voltage level is set higher than the lowest operation voltage level.

Preferably, the portable telephone apparatus has one, two or more additional functions different from the talking function, and the supervision voltage level is set to a voltage level with which operation of the talking function of the portable telephone apparatus is possible but operation of the additional function or functions is impossible.

With the portable telephone apparatus with a battery alarm function, a battery alarm for an additional function is issued before the voltage of the battery apparatus drops to the lowest operation voltage for the talking function, the user can charge up the battery apparatus with certainty before the lowest operation voltage for the talking function is reached.

Consequently, the telephone apparatus provided with various functions can be made the most of while continual use of the talking function of the telephone apparatus is not disturbed.

Preferably, the battery supervision means issues the supervision voltage level alarm in a manner different from that of the lowest operation voltage level alarm.

With the portable telephone apparatus with a battery alarm function, when the voltage of the battery drops to the lowest operation level for an additional function, an alarm (supervision voltage level alarm) can be issued in a manner different from that of an alarm (lowest operation voltage level alarm) for the ordinary talking function.

Consequently, an alarm for the talking function and an alarm for an additional function can be issued in a definitely distinguishing manner, and consequently, the user can accurately recognize which one of the talking function and the additional functions has been disabled.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 3 is a flow chart illustrating operation of the battery supervision section of FIG. 1.

DESCRIPTION OF THE PREFERRED EMBODIMENT

Figure 1:
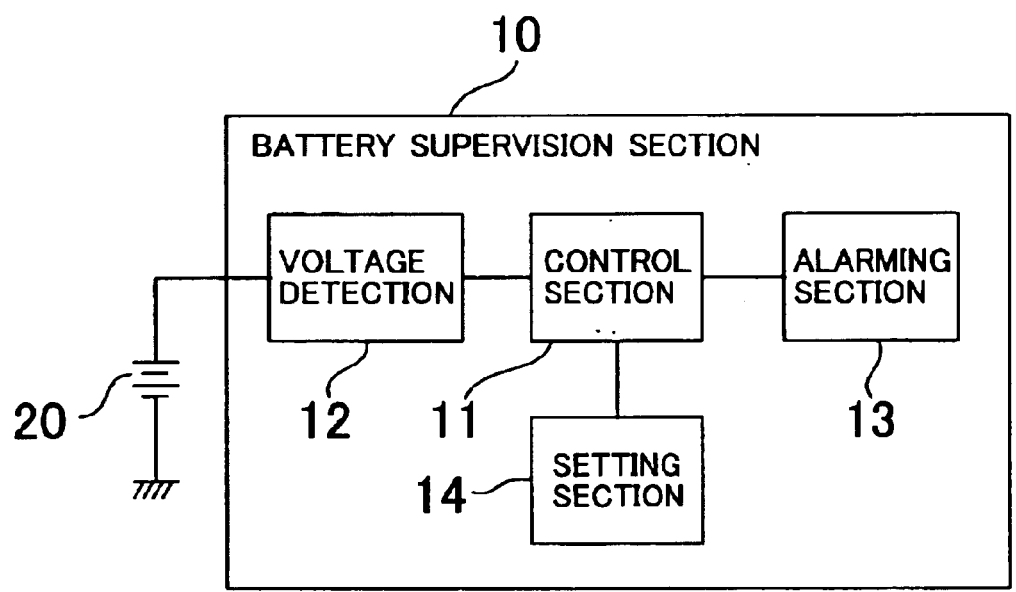
FIG. 1 is a block diagram showing a battery supervision section of a portable telephone apparatus with a battery alarm function to which the present invention is applied.

Referring first to FIG. 1, there is shown a battery supervision section of a portable telephone apparatus with a battery alarm function to which the present invention is applied. The portable telephone apparatus with a battery alarm function is formed, though not particularly shown, as a portable telephone apparatus of the multi-function type which includes a rechargeable battery apparatus and has one, two or more additional functions different from a talking function. The portable telephone apparatus includes, in the inside of an apparatus body not shown, a battery apparatus supervision section 10.

It is to be noted that the one, two or more additional functions provided for the telephone apparatus of the present embodiment are functions other than a talking function with an external apparatus (and a displaying function, a voice function and a setting inputting function necessary for the talking function) which is an original function of a telephone set and include, for example, a transmission/reception function of an electronic mail, a connection function to the Internet, a game function, and a music playback function, and are functions which require an operation voltage different from that for the ordinary talking function.

The portable telephone apparatus in which the battery apparatus supervision section 10 is incorporated includes a rechargeable battery apparatus 20. Meanwhile, the battery apparatus supervision section 10 includes a control section 11, a voltage detection section 12, an alarming section 13 and a setting section 14.

The control section 11 serves as control means for controlling the components of the battery apparatus supervision section 10 and managing the battery alarm function.

The voltage detection section 12 is connected to the battery apparatus 20 and serves as voltage detection means for supervising and detecting the voltage of the battery apparatus 20 and outputting a result of the detection to the battery apparatus supervision section 10.

The alarming section 13 serves as notification means which operates in response to a control signal from the battery apparatus supervision section 10 to issue a notification to a user of the telephone apparatus that the voltage of the battery apparatus has dropped.

The notification may be issued in any form from the alarming section only if the user can be notified of a drop of the battery voltage. For example, a sound alarm by melody sound or the like from a speaker (not shown) of the telephone apparatus may be used. Or, a display alarm by characters, a graphic form or the like by means of a liquid crystal display section (not shown) of the telephone apparatus may be used.

The voltage detection section 12 and the alarming section 13 may have a construction similar to that of a conventional portable telephone apparatus which has a battery apparatus detection function.

The setting section 14 serves as setting inputting means for performing predetermined setting for the battery apparatus supervision section 10 therethrough and allows an inputting operation by means of key input buttons or the like not shown of the telephone apparatus. Setting and alternation of a predetermined lowest operation voltage and a predetermined supervision voltage level on the portable telephone apparatus which are hereinafter described can be performed through the setting section 14.

In the battery apparatus supervision section 10 having such a construction as described above, similarly to a battery detection function provided for a conventional portable telephone apparatus, when a result of detection of the voltage detection section 12 proves that the voltage of the battery apparatus 20 drops to a predetermined lowest operation voltage level with which the talking function of the portable telephone apparatus can operate, the alarming section 13 issues a predetermined lowest operation voltage level alarm under the control of the battery apparatus supervision section 10.

Further, while the battery apparatus supervision section 10 supervises the voltage of the battery apparatus 20, if the voltage of the battery apparatus 20 drops to a predetermined supervision voltage level different from the lowest operation voltage level for the talking function, then the alarming section 13 issues a predetermined supervision voltage level alarm under the control of the control section 11.

Accordingly, the battery apparatus supervision section 10 can be constructed using a structure and functions of an existing portable telephone apparatus, and the battery apparatus supervision function described below can be realized without the necessity for a new structure, a complicated apparatus or the like.

In the following, setting of a supervision level (threshold value) for the battery voltage by the battery apparatus supervision section 10 is described with reference to FIG. 2.

It is to be noted that a setting or alteration operation of the supervision level (threshold value) for the voltage described below can be performed for the control section 11 through the setting section 14 and the external inputting buttons and so forth of the telephone apparatus described above.

The supervision voltage level of the battery supervision section 10 is set higher than the lowest operation voltage level necessary for operation of the talking function of the telephone apparatus. More particularly, the supervision voltage level is set to a voltage level with which operation of the talking function of the portable telephone apparatus of the multi-function type which has one, two or more additional functions other than the talking function is possible but operation of the additional functions is impossible.

Figure 2:
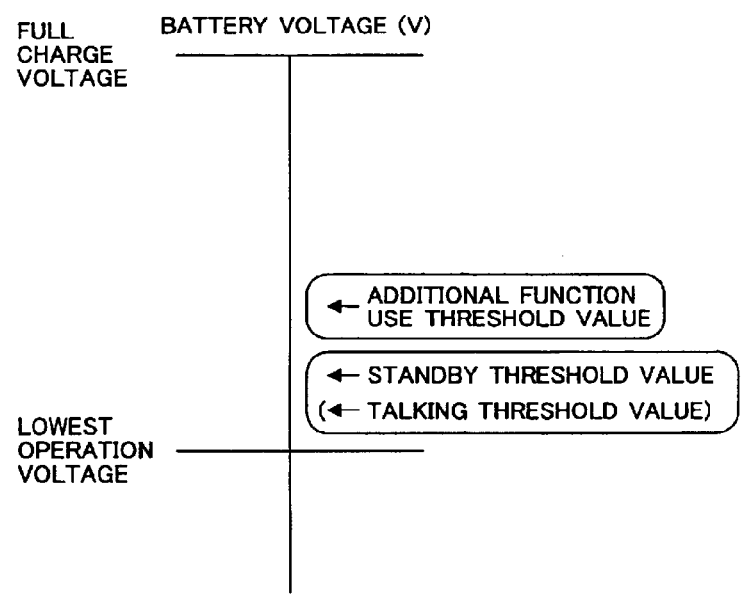
FIG. 2 is a diagrammatic view showing a supervision level for a battery voltage used by the battery supervision section of FIG. 1.

In particular, referring to FIG. 2, a "talking threshold value" and a "standby threshold value" are set as a threshold value for the lowest operation voltage level for use for supervision of the lowest operation voltage necessary for the ordinary talking function.

The threshold value is a level with which it is necessary to end talking after an alarm is issued, switch OFF the apparatus power supply and perform charging. Further, if the telephone apparatus is used across the level, then the voltage of the battery apparatus 20 becomes lower than the lowest operation voltage and consequently the talking function of origination/termination is disabled until the battery apparatus is charged up.

Further, a threshold value for the supervision voltage level with regard to which the battery voltage during operation (use) of an additional function is supervised is set in addition to the threshold value for the talking function as seen in FIG. 2.

For the supervision voltage level during operation of an additional function, a threshold value higher than the lowest operation voltage level for the talking function (the "talking threshold value" and the "standby threshold value" shown in FIG. 2) is set (an "additional function use threshold value (OptLevel)" shown in FIG. 2).

The threshold value mentioned is set to a value with which the talking function (origination/termination functions) of the telephone apparatus is possible even after an alarm (alarm) is issued.

The threshold value for the supervision voltage level can be set to an arbitrary value to the control section 11.

Consequently, an optimum value can be set as the threshold value in accordance with a necessary operation voltage for each different additional function.

Further, while, in FIG. 2, only one threshold value is shown as the supervision voltage level for an additional function, otherwise a plurality of such supervision voltage levels may be set.

Where a plurality of supervision voltage levels are set arbitrarily, for example, it is possible to set a plurality of supervision voltage levels for each additional function or to set supervision voltage levels different from each other for two or more additional functions.

Where a plurality of supervision voltage levels are set in this manner, an alarm can be issued in a different manner (which is hereinafter described) depending upon, for example, whether a notification of at what level the battery voltage is should be issued or another notification of use of what additional function is impossible is issued and use of what additional function is possible should be issued.

If the voltage of the battery apparatus 20 drops to the supervision voltage level (additional function use threshold value) set in this manner, a predetermined alarm (supervision voltage level alarm) is issued from the alarming section 13.

The supervision voltage level alarm for notification of a drop of the voltage of the battery apparatus during use of an additional function preferably has a form different from that of the lowest operation voltage level alarm for the ordinary talking function. For example, it is possible to generate an alarm sound different from that of the lowest operation voltage level alarm for the ordinary talking function or display a different message on the liquid crystal display section.

Consequently, the alarm for the talking function and the alarm for an additional function are distinguished definitely from each other, and therefore, the user can recognize accurately which one of the talking function and the additional functions is disabled with the current voltage level of the battery apparatus.

Further, where a plurality of supervision voltage levels are set, it is possible to issue the supervision voltage level alarm in a manner different for each of the plurality of supervision voltage levels. For example, where a plurality of threshold values are set for an additional function, it is possible to issue an alarm only in the form of an alarm sound for the first stage but issue an alarm in the form of an alarm sound and a message display for the second stage.

By issuing alarms at different stages in response to a drop level of the battery voltage or issuing an alarm for each of two or more additional functions whose operation voltages are different from each other in this manner, information such as at what level the voltage of the battery apparatus is or which additional function is disabled and which additional function is enabled can be conveyed to the user with certainty.

Subsequently, operation of the portable telephone apparatus with a battery alarm function having such a construction as described above is described with reference to FIG. 3.

It is to be noted that, in the portable telephone apparatus with a battery alarm function of the present embodiment, the control section 11 for controlling a voltage supervision operation includes a save register (in the present specification, referred to as "BattReg" register) not shown for saving the threshold value for the lowest operation voltage level for the ordinary talking function and sets a flag (referred to as "OptFlg" flag) indicating that a battery voltage supervision operation by the battery apparatus supervision section 10 is proceeding when operation of the additional function is started. Further, the control section 11 sets a flag (referred to as "MesFlg") indicating that an alarm has been issued after a predetermined supervision voltage alarm is issued.

In the following, the voltage supervision operation is described with reference to a flow chart of FIG. 3.

First, if operation of an additional function such as a game function or a music playback function is started in response to an operation of a user (step 1), then a threshold value for supervision of the lowest operation voltage level for the ordinary talking function is saved into the "BattReg" register by the control section 11 (step 2). Then, a threshold value ("OptLevel") for the supervision voltage level for supervision of a predetermined additional function is set (step 3).

Simultaneously, the flag "Optflag" indicating that an additional function is operating is set (step 4).

It is to be noted that, when no additional function is used (step 1), supervision of the lowest operation voltage level for the ordinary talking function is performed (steps 14 and 15).

If the voltage of the battery apparatus 20 drops as a result of operation of the additional function until it becomes lower than the threshold value ("OptLevel") for the predetermined supervision voltage level (refer to FIG. 2), then the drop of the voltage is detected by the voltage detection section 12 and the control section 11 (step 5).

If it is detected that the voltage is lower than the threshold value for the supervision voltage level, then the control section 11 checks whether or not the "OptFlg" flag is set (step 6). If the flag is set, then it is discriminated whether or not the voltage of the battery apparatus 20 which has dropped is lower than the threshold value for the lowest operation voltage level saved in the "BattReg" register (step 7).

If the battery voltage is not lower than the lowest operation voltage level, then the control section 11 checks whether or not the "MesFlg" flag is set (step 8). If the flag is reset, then since an alarm has not been issued, then a predetermined alarm (supervision voltage level alarm) is issued from the alarming section 13 (step 9). Further, together with the issuance of the alarm, the "MesFlg" flag indicating that an alarm has been issued is set (step 10).

It is to be noted that, since an alarm is not issued if it is confirmed in step 8 that the flag is set, the alarm is not issued repetitively.

Thereafter, if an operation for ending the additional function is performed by the user (step 11), then the control section 11 reads out the threshold value for the lowest operation voltage level for the ordinary talking function saved in the "BattReg" register and sets the threshold value (step 12). Then, the "OptFlg" flag indicating that a voltage supervision operation for an additional function is proceeding and the "MesFlg" flag indicating that an alarm has been issued are set (step 13), and a voltage supervision condition for the ordinary talking function is established.

It is to be noted that, when the "OptFlg" flag is reset in step 6 or when it is discriminated in step 7 that the voltage of the battery apparatus 20 is lower than the threshold value for the lowest operation voltage level saved in the "BattReg" register, then supervision and processing for the lowest operation voltage for the ordinary talking function are performed (steps 14 and 15).

As described above, with the portable telephone apparatus with a battery alarm function according to the present embodiment, since it includes battery supervision means for setting a predetermined voltage different from a lowest operation voltage necessary for operation of an original talking function of a telephone set as a supervision voltage level, that the voltage of a battery apparatus has dropped through use of an additional function other than the talking function can be detected definitely and with certainty and can be conveyed to the user.

Consequently, since the user can perform charging of the battery apparatus precisely before the lowest operation voltage necessary for operation of the original talking function of a telephone set is reached, the portable telephone apparatus can be formed so as to cope with various multiple functions while assuring the talking function.

Particularly by issuing an alarm at different stages in response to a dropping level of the voltage or by issuing an alarm for each of two or more additional functions for which different lowest operation voltages are required, information of at what level the voltage of the battery apparatus is, which additional function cannot be used and which additional function can be used and so forth can be conveyed with certainty to the user.

Consequently, the user can use the multi-function telephone apparatus free from care without being concerned about inadvertent consumption of the battery apparatus. Thus, the telephone apparatus is most suitable for a digital portable telephone apparatus provided with various additional functions such as a connection function to the Internet, a game function and a playback function of music data.

It is to be noted that the portable telephone apparatus with a battery alarm function of the present invention is not limited to the embodiment described above but can be modified in various manners within the spirit or the scope of the present invention.

For example, the additional functions provided for the portable telephone apparatus are not limited to such functions as a connection function to the Internet, a game function and a playback function of music data described above, but naturally all additional functions which may be incorporated in a portable telephone apparatus may be used as such additional functions.

Further, when the voltage of the battery apparatus drops to a predetermined supervision voltage level through use of an additional function, while, in the embodiment described above, only an alarm by sound or a display is issued, the control section may be set so that ending processing for the additional function is performed additionally.

This is effective to prevent consumption of the battery apparatus through use of an additional function more positively and with a higher degree of certainty.

For example, when the battery voltage drops to a predetermined supervision voltage level, it is possible to perform ending processing of an additional function after a confirmation message is outputted or displayed or to issue an alarm sound or a warning display when the voltage drops to the first stage and perform ending processing of the additional function when the voltage drops to the second stage.

What is claimed is:

1. A portable telephone apparatus with a battery alarm function, comprising:

a rechargeable battery apparatus;

a plurality of additional function means requiring operation voltages individually different from each other and different from that for an ordinary talking function;

battery supervision means for supervising a voltage of said battery apparatus; and alarm means for performing an alarming operation in accordance with the supervised voltage by said battery supervision means;

said battery supervision means having a lowest operation voltage level, with which the talking function of said portable telephone apparatus can operate in the minimum, set therein for the supervised voltage of said battery apparatus;

said battery supervision means further having a plurality of additional function voltage levels, which are different among the different additional function means and higher than the lowest operation voltage level, set therein for the supervised voltage of the battery apparatus;

said battery supervision means causing, when the voltage of said battery apparatus detected thereby is equal to the lowest operation voltage level, said alarm means to perform a normal alarming operation of issuing a notification of a voltage drop of said battery apparatus whereas said battery supervision means causes, when the voltage of said battery apparatus detected thereby is equal to one of the additional function voltage levels, said alarm means to perform an alarming operation prescribed for the additional function means corresponding to the additional function voltage level.

* * * * *